(12) United States Patent
Booth et al.

(10) Patent No.: US 7,516,237 B2
(45) Date of Patent: Apr. 7, 2009

(54) SCALABLE DEVICE-TO-DEVICE INTERCONNECTION

(75) Inventors: Bradley J. Booth, Austin, TX (US); Quang Le, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 779 days.

(21) Appl. No.: 10/645,045

(22) Filed: Aug. 20, 2003

(65) Prior Publication Data

US 2005/0044257 A1 Feb. 24, 2005

(51) Int. Cl.
  G06F 15/16 (2006.01)
  H04J 3/16 (2006.01)
(52) U.S. Cl. ........................ 709/232; 709/250; 370/465
(58) Field of Classification Search ......... 709/227–233, 709/248–250; 370/419, 445, 463–465
  See application file for complete search history.

(56) References Cited

U.S. PATENT DOCUMENTS

| 6,094,439 | A | 7/2000 | Krishna et al. |
| 6,169,729 | B1 | 1/2001 | Feuerstraeter |
| 2002/0184550 | A1 | 12/2002 | Chadha et al. |
| 2003/0097480 | A1 | 5/2003 | Feuerstraeter et al. |
| 2003/0137939 | A1 | 7/2003 | Dunning et al. |
| 2003/0235203 | A1* | 12/2003 | Alderrou et al. ............ 370/445 |
| 2005/0013311 | A1* | 1/2005 | Samudrala et al. .......... 370/412 |

OTHER PUBLICATIONS

Geoff Waters, 10 Gigabit Ethernet and the XAUI interface, Jan. 2002, Agilent Technologies, pp. 5, 8, 11, and 12.*
Applicaiton Note, Implementing an 8b/10b Encoder/Decoder for Gigabit Ethernet in the Actel SX FPGA Family, Oct. 1998, Actel Corporation, p. 9.*
David Fifield, GMII Electrical Specification, Jan. 1997, IEEE Interim Meeting, p. 12 and 13.*
Kimmo Pulakka, Optimization of the utilization of a Packet Switched Backbone Network by Using a Control system for Low Priority Traffic, 2000, IEEE.*
NIST, NIST definition of state machine.*
Pending U.S. Appl. No. 09/141,151, filed Aug. 27, 1998, to Dunning et al.
Pending U.S. Appl. No. 09/470,189, filed Dec. 22, 1999, to Drottar et al.
Pending U.S. Appl. No. 10/294,180, filed Nov. 13, 2002, to Dunning et al.
Pending U.S. Appl. No. 10/403,145, filed Mar. 31, 2003, to Dabral et al.
IEEE Std. 802.3ae—2002, Clauses 45-48.

(Continued)

*Primary Examiner*—Yasin M Barqadle
(74) *Attorney, Agent, or Firm*—Blakely, Sokoloff, Taylor & Zafman LLP

(57) ABSTRACT

Described are a device and system to transmit data to or receive data from one or more data lane interfaces. Each data lane interface may be capable of transmitting a serial data signal to or receiving a serial data signal from a data lane in a device-to-device interconnection. An effective data rate may be varied based, at least in part, upon a number of the data lane interfaces actively transmitting a serial data signal to or receiving a serial data signal from the device-to-device interconnection.

34 Claims, 5 Drawing Sheets

OTHER PUBLICATIONS

IEEE Draft P802.3ak/D4.0, Mar. 24, 2003.

"International Search Report dated Dec. 24, 2005", PCT/US2004/026891, 5 pgs.

"Written Opinion of the International Searching Authority dated Dec. 13, 2004", PCT/US2004/026891, 10 pgs.

Cunningham, D. G., "The Status of the 10-Gigabit Ethernet Standard", *Proceedings of ECOC '01*, 3, (Sep. 30, 2001),364-367.

Pulakka, K., et al., "Optimization of the Utilization of a Packet Switched Backbone Network by Using a Control System for Low Priority Traffic", *Proceeding of the IEEE International Conference on Performance, Computing, and Communications*, Phoenix, AZ,(Feb. 20, 2000),124-131.

Chu, Yi-Chin (Cisco Systems, Inc.), "Serial-GMII Specification," Revision 1.7, Document No. ENG-46158, 10 pages, Jul. 19, 2001.

Chu, Yi -Chin (Cisco Systems, Inc.), "Serial-GMII Specification," Revision 1.1, Document No. ENG-46158, 9 pages, Nov. 10, 1999.

* cited by examiner

SCALABLE DEVICE-TO-DEVICE INTERCONNECTION

BACKGROUND

1. Field

The subject matter disclosed herein relates to interfaces between devices. In particular, the subject matter disclosed herein relates to devices capable of transmitting or receiving data at more than one data rate.

2. Information

Semiconductor devices in a printed circuit board (PCB) typically communicate through a device-to-device interconnection (DDI). Such a DDI typically includes copper traces formed in the PCB to transmit signals between devices. A device may be coupled to a DDI by solder bonding or a device socket secured to the PCB.

IEEE Std. 802.3ae-2002, Clause 47 defines a 10 Gigabit Attachment Unit Interface (XAUI) for transmitting data between devices in data lanes. Each data lane typically transmits a serial data signal between the devices using a differential signaling pair. A XAUI is typically coupled to a 10 Gigabit Media Independent Interface (XGMII) which is capable of transmitting or receiving data at a data rate of ten gigabits per second. In addition, the XAUI format may be used in transmitting data over an Infiniband 4× cable as described in the proposed 10GBASE-CX4 standard presently being explored by the IEEE P802.3ak working group.

BRIEF DESCRIPTION OF THE FIGURES

Non-limiting and non-exhaustive embodiments of the present invention will be described with reference to the following figures, wherein like reference numerals refer to like parts throughout the various figures unless otherwise specified.

DETAILED DESCRIPTION

Figure 1:
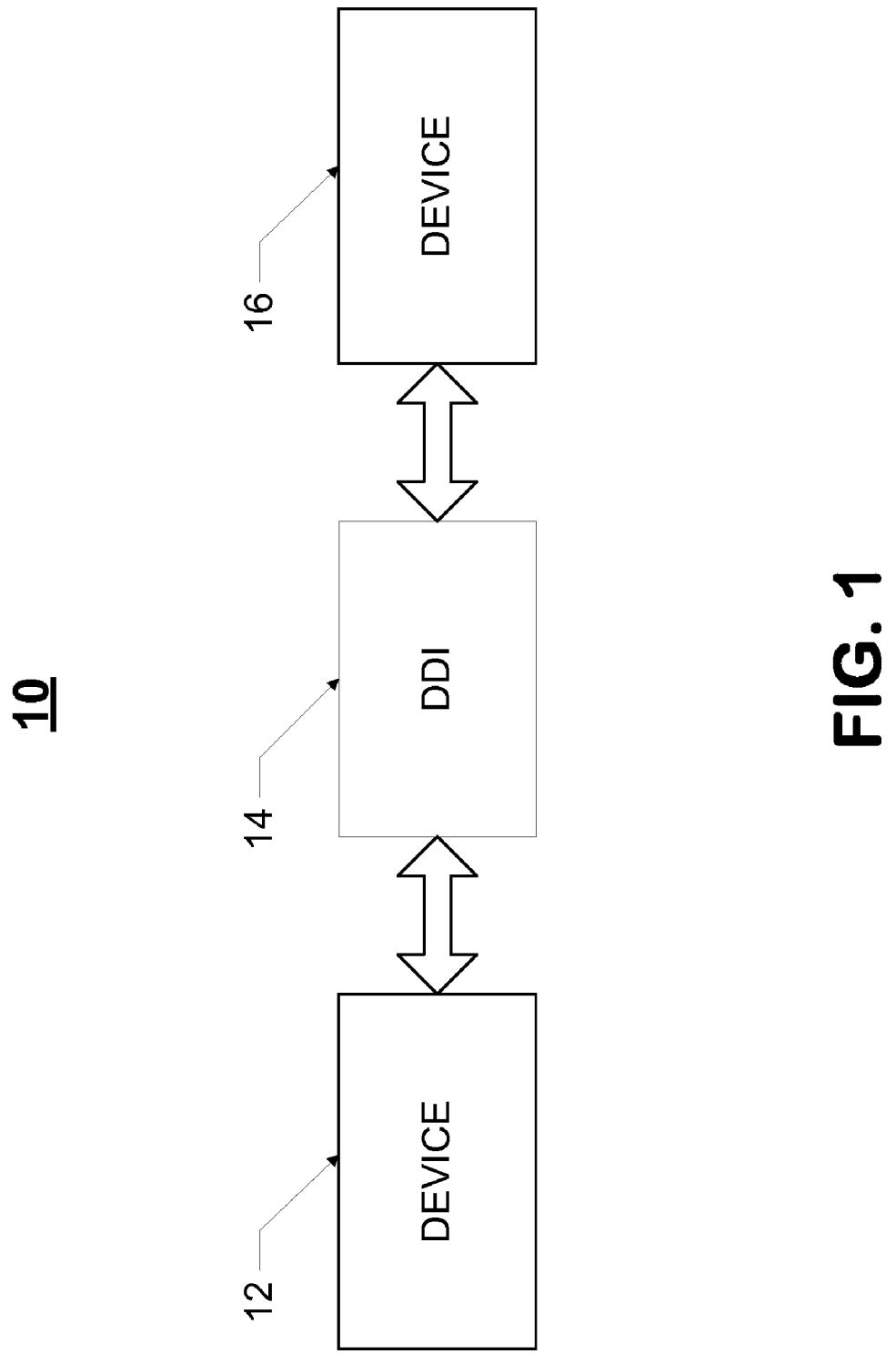
FIG. 1 shows a schematic diagram of devices coupled by a device-to-device interconnection (DDI) according to an embodiment of the present invention.

Reference throughout this specification to "one embodiment" or "an embodiment" means that a particular feature, structure, or characteristic described in connection with the embodiment is included in at least one embodiment of the present invention. Thus, the appearances of the phrase "in one embodiment" or "an embodiment" in various places throughout this specification are not necessarily all referring to the same embodiment. Furthermore, the particular features, structures, or characteristics may be combined in one or more embodiments.

"Machine-readable" instructions as referred to herein relate to expressions which may be understood by one or more machines for performing one or more logical operations. For example, machine-readable instructions may comprise instructions which are interpretable by a processor compiler for executing one or more operations on one or more data objects. However, this is merely an example of machine-readable instructions and embodiments of the present invention are not limited in this respect.

"Machine-readable medium" as referred to herein relates to media capable of maintaining expressions which are perceivable by one or more machines. For example, a machine-readable medium may comprise one or more storage devices for storing machine-readable instructions or data. Such storage devices may comprise storage media such as, for example, optical, magnetic or semiconductor storage media. However, these are merely examples of a machine-readable medium and embodiments of the present invention are not limited in this respect.

"Logic" as referred to herein relates to structure for performing one or more logical operations. For example, logic may comprise circuitry which provides one or more output signals based upon one or more input signals. Such circuitry may comprise a finite state machine which receives a digital input and provides a digital output, or circuitry which provides one or more analog output signals in response to one or more analog input signals. Such circuitry may be provided in an application specific integrated circuit (ASIC) or field programmable gate array (FPGA). Also, logic may comprise machine-readable instructions stored in a memory in combination with processing circuitry to execute such machine-readable instructions. However, these are merely examples of structures which may provide logic and embodiments of the present invention are not limited in this respect.

A "device-to-device interconnection" (DDI) as referred to herein relates to a data link to transmit data between devices. For example, a DDI may be formed by conductive traces formed on a circuit board between device sockets to receive devices. A DDI may traverse multiple devices coupled between two devices over a backplane and comprise conductive traces coupling the devices to one another. In another example, a DDI may comprise a cable coupled between two connectors at opposite ends of the cable. Each connector may then transmit data between the cable and a device coupled to the connector by conductive traces. However, these are merely examples of a DDI and embodiments of the present invention are not limited in these respects.

A data link formed in a DDI may comprise a plurality of "data lanes" where each data lane may transmit data from a source to a destination independently of other data lanes. Each data lane in a data link may transmit symbols in a transmission medium which are decoded into data bits at a destination. However, this is merely an example of data lanes that may be used to transmit data in a DDI and embodiments of the present invention are not limited in these respects. A "data lane pair" or "pair of data lanes" as referred to herein relates to two data lanes coupled between a first and second device including a first data lane to transmit data from the first device to the second device and a second data lane to transmit data from the second device to the first device.

A "data lane interface" as referred to herein relates to a portion of a device that is capable of transmitting a signal to or receiving a signal from a data lane. For example, a data lane interface may comprise conductive pins that are capable of being coupled to a data lane formed in a printed circuit board by, for example, solder bonding or a device socket. Alternatively, a data lane interface may comprise conductive pins that are capable of being coupled to a cable through a cable connector. However, these are merely examples of a data lane interface and embodiments of the present invention are not limited in these respects.

A "serial data signal" as referred to herein relates to a signal comprising information encoded into a series of symbols. For example, a serial data signal may comprise a series of symbols transmitted in a transmission medium where each symbol is transmitted in a symbol period. However, this is merely an example of a serial data signal and embodiments of the present invention are not limited in these respects.

A "differential pair signal" as referred to herein relates to a pair of synchronized signals to transmit encoded data to a destination. For example, differential pair may transmit a serial data signal comprising symbols to be decoded for data recovery at a destination. Such a differential pair may transmit each symbol as a voltage on each of two transmission media. However, these are merely examples of a differential pair and embodiments of the present invention are not limited in these respects.

"Actively transmitting" as referred to herein relates to a state of a data lane interface in transmitting data to a data lane. For example, a data lane interface may be actively transmitting a serial data signal when coupled to a data lane and, at least periodically in the presence of data to be transmitted, applying voltage signals to a data lane contact. "Actively receiving" as referred to herein relates to a state of data lane interface in receiving data from a data lane. For example, a data lane interface may be actively receiving a serial data signal when coupled to a data lane and, at least periodically when the data lane is transmitting voltages to the data lane interface, receiving one or more voltage signals from the data lane. However, these are merely examples of when a data lane interface may be actively transmitting or actively receiving, and embodiments of the present invention are not limited in these respects.

An "8B10B encoding scheme" as referred to herein relates to a process by which eight-bit data bytes may be encoded into ten-bit "code groups," or a process by which ten-bit code groups may be decoded to eight-bit data bytes. An "8B10B encoder" as referred to herein relates to logic to encode an eight-bit data byte to a ten-bit code group, and an "8B10B decoder" as referred to herein relates to logic to decode an eight-bit byte from a ten-bit code group. An "8B10B codec" as referred to herein relates to a combination of an 8B10B encoder and an 8B10B decoder.

A "state machine" as referred to herein relates to logic that may define one or more states. For example, a state machine may respond to inputs by changing one or more of its states. A state machine may receive a data input from a source and provide a data output to a destination where the data output is indicative of one or more states of the state machine. Such a data output may be provided to the destination in a particular data format and at a particular data rate. However, these are merely examples of a state machine and embodiments of the present invention are not limited in these respects.

A "media independent interface" (MII) as referred to herein relates to an interface to receive data from a source or transmit data to a destination in a format which is independent of a particular transmission medium for transmitting the data. For example, a data transceiver may transmit data to a transmission medium in a data transmission format in response to data received at an MII. Also, a data transceiver may provide data to an MII in response to receiving data from a transmission medium in a data transmission format. An MII may also receive data from or provide data to a state machine coupled to one or more data lanes in a DDI. A "Gigabit MII" (GMII) as referred to herein relates to an MII capable of receiving data from a source or transmitting data to a destination at a data rate of about one gigabit per second. A "10 Gigabit MII" (XGMII) as referred to herein relates to an MII capable of receiving data from a source or transmitting data to a destination at a data rate of about ten gigabits per second. However, these are merely examples of an MII and embodiments of the present invention are not limited in these respects.

An "attachment unit interface" (AUI) as referred to herein relates to a physical medium capable of transmitting data between an attachment to a transmission medium of data network and data terminal equipment. An "Extended Attachment Unit Interface" as referred to herein relates to a data link capable of transmitting data between an MII and data transceiver. A "10 Gigabit Extended Attachment Unit Interface" (XAUI) as referred to herein relates to an extended attachment unit interface capable of transmitting data between an XGMII and a data transceiver. Other Extended Attachment Unit Interfaces may be defined for higher data rates such as 40 or 100 gigabits per second.

Briefly, an embodiment of the present invention relates to a device to transmit data to or receive data from one or more data lane interfaces at a data rate. Each data lane interface may be capable of transmitting a serial data signal to or receiving a serial data signal from a data lane in a device-to-device interconnection. The data rate may be varied based, at least in part, upon a number of the data lane interfaces actively transmitting a serial data signal to or actively receiving a serial data signal from the device-to-device interconnection. However, this is merely an exemplary embodiment and other embodiments of the present invention are not limited in these respects.

FIG. 1 shows a schematic diagram of devices 12 coupled by a DDI 14 according to an embodiment of the present invention. According to an embodiment, the DDI 14 may comprise a plurality of data lanes (not shown) formed in copper traces of a printed circuit board (not shown) or in a cable coupled between the devices 12. However, this is merely an example of how data lanes may be formed in a DDI and embodiments of the present invention are not limited in this respect. Each data lane may transmit or receive data in one or more differential pair signals. However, this is merely an example of how data may be transmitted in a data lane and embodiments of the present invention are not limited in this respect.

For full-duplex communication, a corresponding pair of data lanes may employ two differential pair signals (e.g., one differential pair signal for transmitting data from a device on a first data lane and one differential signaling pair for receiving data at the device on a second data lane). Alternatively, a single data lane may employ a single differential pair signal for communicating in a half-duplex operating mode. However, this is merely an example of how full or half duplex communication may be implemented using differential pair signals, and embodiments of the present invention are not limited in these respects.

According to an embodiment, in addition to being coupled to the DDI 14, the devices 12 and 16 may be coupled to other devices in any one of several data communication systems or input/output architectures. For example, either of the devices 12 or 16 may comprise a media independent interface (MII) for coupling to other devices such as a media access controller (MAC) (not shown). Such a MAC may couple the device 12 or 16 to any one of several other I/O devices such as, for example, a multiplexed data bus, multi-port switch fabric or backplane Ethernet switch. The MAC may also couple the device 12 or 16 to one or more packet classification devices (e.g., for network protocol processing) such as a network processor or packet classification ASIC. However, these are merely examples of devices that may be coupled to an MII through a MAC and embodiments of the present invention are not limited in these respects.

In another embodiment, the device 12 or 16 may comprise an MII coupled to a physical layer communication device (not shown) for transmitting or receiving data in a transmission medium such as, for example, coaxial, fiber optic or twisted wire pair cabling. However, these are merely examples of data transmission media that may be used for transmitting data from or receiving data at a MII and embodiments of the present invention are not limited in these respects.

In alternative embodiments, the device 12 or device 16 may be integrated with a MAC or physical layer communication device independently of an MII. For example, the device 12 or device 16 may comprise a transmitting or receiving state machine integrated with the MAC or physical layer communication device independently of a MAC. However, these are merely alternative embodiments and other embodiments are not limited in these respects.

Figure 2:
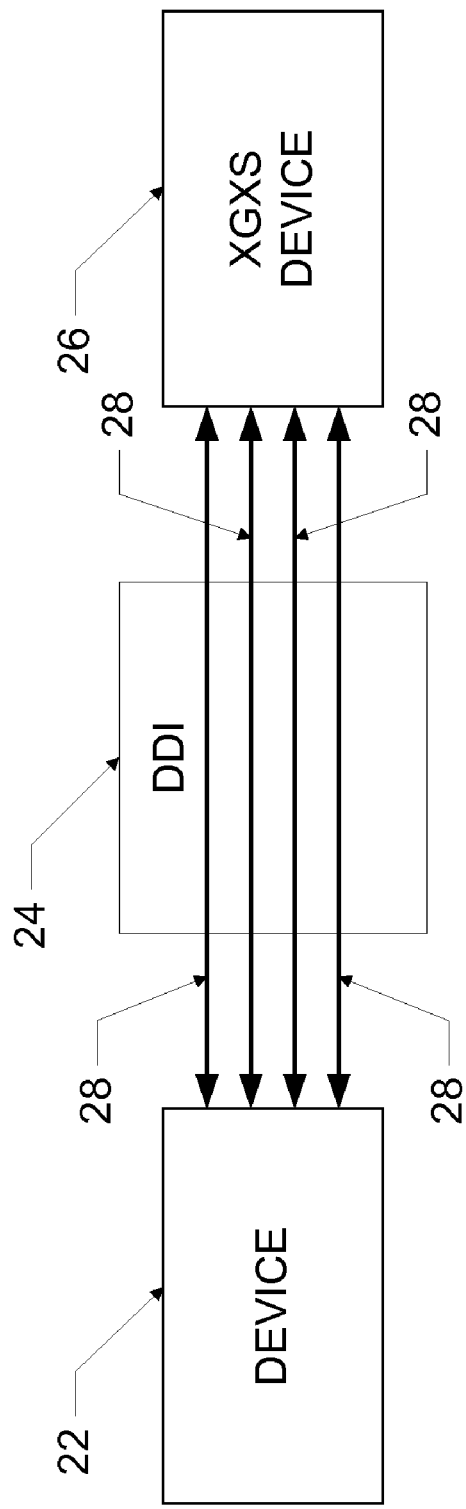
FIG. 2 shows a schematic diagram of devices coupled by four data lanes of a DDI according to an embodiment of the devices shown in FIG. 1.
Figure 3:
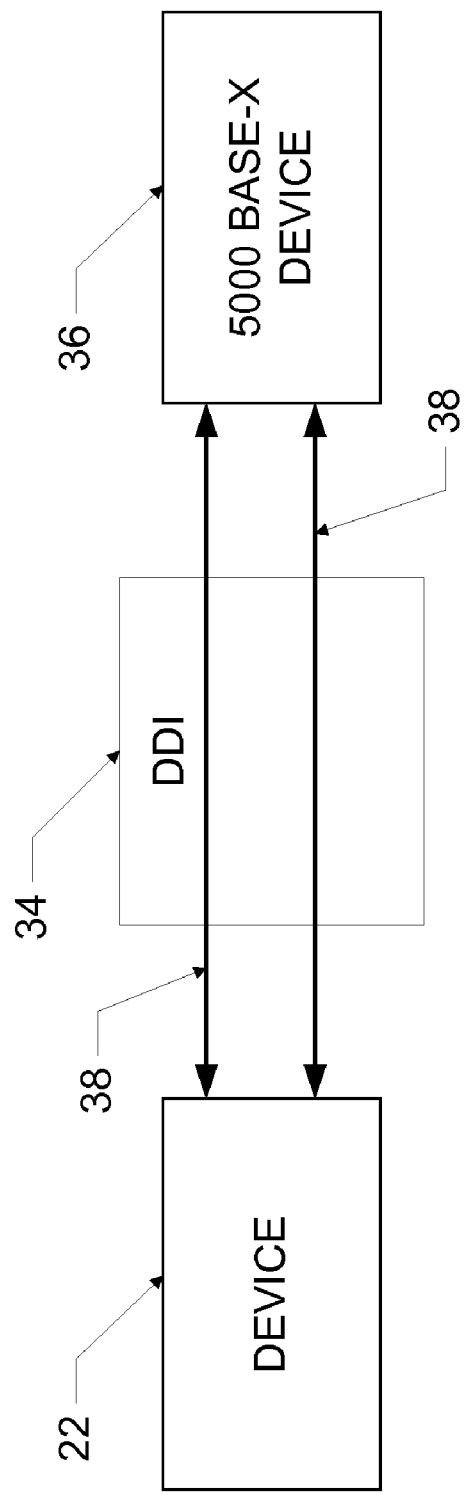
FIG. 3 shows a schematic diagram of devices coupled by two data lanes of a DDI according to an embodiment of the devices shown in FIG. 1.
Figure 4:
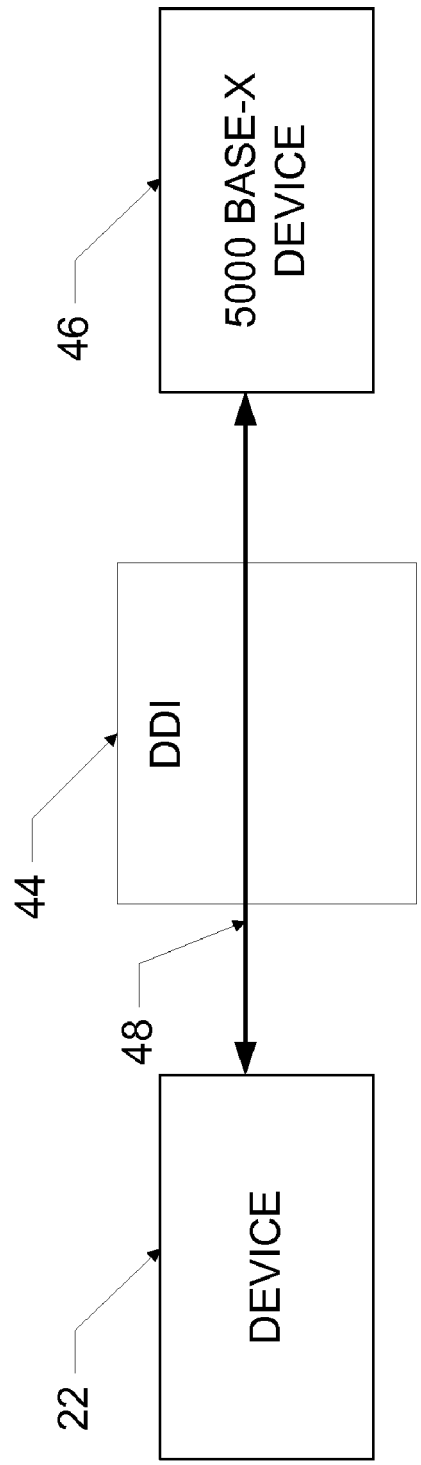
FIG. 4 shows a schematic diagram of devices coupled by one data lane of a DDI according to an embodiment of the devices shown in FIG. 1.

FIGS. 2 through 4 illustrate the use of a device 22 that is capable of transmitting or receiving data from a DDI having two, four or eight pairs of data lanes. The device 22 may also comprise an MII (not shown) to transmit data between the DDI and another device (e.g., a MAC or physical layer communication device, not shown). Alternatively, the device 22 may be integrated with a MAC or physical layer communication device independently of such an MII. In either such embodiment, the device 22 may transmit data between the DDI and other device at a data rate. In the particular embodiments described with reference to FIGS. 2 through 4, each of the data lanes may be capable of transmitting data at a set data rate such as 2.5 gigabits per second (e.g., about 3.125 gigabits per second including overhead), full-duplex. However, this is merely an example data rate for a data lane and other embodiments may be directed to data lanes transmitting data at different rates. According to an embodiment, the device 22 may vary the data rate at which data is transmitted between the DDI and another device (e.g., a MAC or physical layer communication device, not shown) based upon a number of data lanes being used to actively transmit or receive data in the DDI.

In FIG. 2, a DDI 24 comprising four pairs of data lanes 28 coupled to a device 22 (where a first data lane in a pair 28 transmits first serial data signal from the device 22 and a second data lane in the pair 28 transmits a second serial data signal away from the device 22) may couple the device 22 to a 10 Gigabit Media Independent Interface Extender Sublayer (XGXS) device 26 to behave according to IEEE Std. 802.3ae-2002, Clause 47. The DDI 24 may provide a 10 Gigabit Attachment Unit Interface (XAUI). Accordingly, the device 22 may be configured as an XGXS device to transmit data to or receive data from the DDI 24 at a data rate of about 10 gigabits per second.

In FIG. 3, a DDI 34 comprising two pairs of data lanes 38 may couple the device 22 to a device 36 capable of transmitting data between the devices 22 and 36 at a data rate of about five gigabits per second (e.g., as a 5000BASE-X device). Accordingly, the device 22 may be configured to transmit data to or receive data from the DDI 24 at a data rate of about five gigabits per second.

In FIG. 4, a DDI 44 comprising a single pair of data lanes 48 may couple the device 22 to a device 46 capable of transmitting data between the devices 22 and 46 at a data rate of about 2.5 gigabits per second (e.g., as a 2500 BASE-X device). Accordingly, the device 22 may be configured to transmit data to or receive data from the DDI 44 at a data rate of about 2.5 gigabits per second.

In the embodiments described above with reference to FIGS. 2 through 4, in addition to the device 22, any of the devices 26, 36 or 46 may similarly be configured to transmit or receive data on one, two or four pairs of data lanes. In these particular embodiments, a DDI of one, two or four pairs of data lanes may be used to transmit data between the device 22 and any of the devices 26, 36 or 46. Any of these devices 26, 36 or 46 may also have the capability of varying a data rate at which data is transmitted to or received from the DDI based upon a number of data lanes in the DDI.

Figure 5:
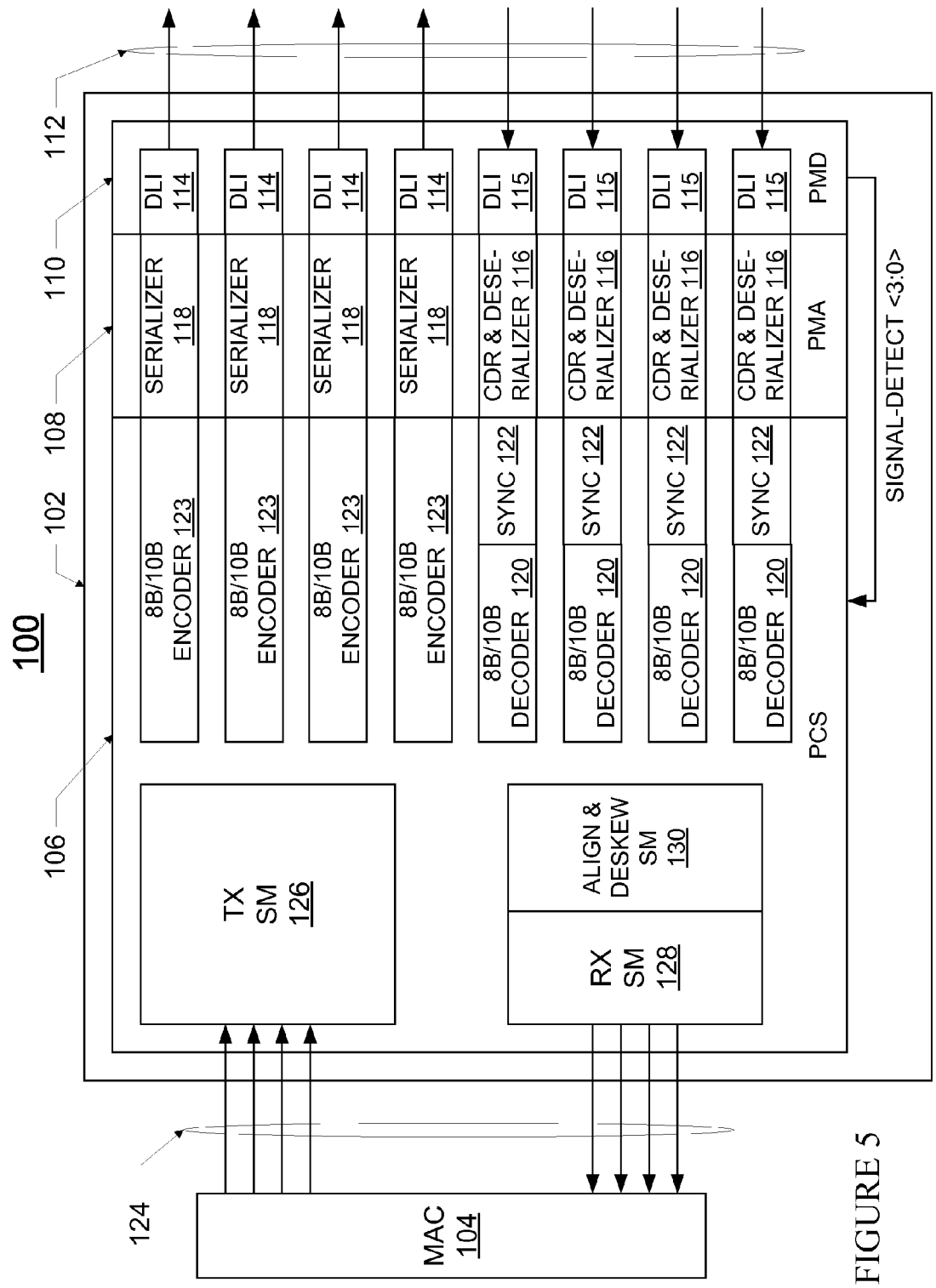
FIG. 5 shows a schematic diagram of a device which is capable of selectively varying a data rate based upon a number of data lanes actively transmitting or actively receiving data from a DDI according to an embodiment of a device shown in FIGS. 2 through 4.

FIG. 5 shows a schematic diagram of a device 102 which is capable of selectively varying a data rate at an MII 124 based upon a number of data lanes 112 actively transmitting or actively receiving data from a DDI according to an embodiment of the device 22 shown in FIGS. 2 through 4. The device 102 may be formed in one or more semiconductor devices using techniques known to those or ordinary skill in the art of logic design. Alternatively, one or more of the illustrated portions may be implemented machine-readable instructions that are executable by a processor or microcontroller. However, these are merely examples of how a device to transmit data between an MII and a DDI may be implemented and embodiments of the present invention are not limited in these respects.

The device 102 may comprise a physical medium dependent (PMD) sublayer section 110 capable of transmitting signals to or receiving signals from one or more pairs of data lanes 112, and a physical coding sublayer (PCS) section 106 capable of transmitting data to or receiving data from the MII 124. A physical media attachment (PMA) sublayer section 108 is coupled to the PMD section 110 and PCS section 106 to transmit parallel data signals to the PCS section 106 in response to signals from the PMD section 110, and to transmit encoded data signals to the PMD section 110 in response to parallel data signals from the PCS section 106.

The PMD section 110 comprises a plurality of data lane interfaces (DLIs) 114 and 115 where each DLI may be coupled to an associated data lane 112. Each DLI 114 and 115 may comprise conductive pins (not shown) adapted to being coupled to conductive elements on a printed circuit board by, for example, solder bonding or a device socket. Alternatively, each DLI 114 and 115 may be coupled to a cable through a conductive cable connector. Each DLI may comprise a set of conductive pins to transmit serial data to, or receive serial data from, an associated data lane 112. The associated data lane 112 may transmit serial data signals to or receive serial data signals from the DDI as a differential pair signal.

For each DLI 115 of the PMD section 110, the PMA section 108 may comprise a clock and data recovery (CDR) and deserializer circuit 116. The CDR portion may generate serial data in response to a differential pair signal from an associated DLI 115. In response to the serial data from the CDR portion, the deserializer portion may provide a ten-bit parallel data word to the PCS section 106 on byte intervals. Similarly, for each DLI 114, a serializer circuit 118 may generate serial data for transmission through the DLI 114 in response to receipt of a ten-bit parallel data word from the PCS section 106 on byte intervals (e.g., through printed circuit board traces or through a connector and cable in a 10GBASE-CX implementation).

For each DLI 115 of the PMD section 110, the PCS section 106 may comprise a synchronization circuit 122 and an 8B10B decoder 120. From the ten bit parallel data received from the PMA section 108, the synchronization circuit 122 may detect boundaries between sequential ten bit "code groups" as described in IEEE Std. 802.3ae-2002, Clause 48.2.4.2.1. The 8B10B decoder 120 may then decode the sequential ten bit code groups into eight bit bytes as described in IEEE Std. 802.3-2000, Clause 36 and provide the decoded bytes to an alignment and deskew state machine 130. In response to receipt of eight bit bytes from a transmit state machine 126 on byte intervals, an 8B10B encoder 123 may encode each eight bit byte to a ten bit code group for transmission on an associated DLI 114.

According to an embodiment, the code groups received at the 8B10B decoder 120 comprise encoded data and control symbols such as an alignment character indicating a temporal alignment of the of the data received in the data lane. The alignment characters may be inserted at random times in the data lanes. For example, the insertion of alignment characters may occur during inter-frame gaps or idle periods to reduce data overhead impacts. In addition to providing decoded eight bit bytes to the alignment and deskew state machine 130, the 8B10B decoder 120 may indicate the location of detected alignment characters among the decoded eight bit bytes. Alternatively, the alignment and deskew state machine 130 may determine the location of alignment characters independently of the 8B10B decoder 120. Receiving decoded eight bit bytes from each of the DLIs 115 that are actively receiving data from a data lane 112, the alignment and deskew state machine 130 may concatenate four aligned bytes forming a 32-bit word to be provided to a receive state machine 128. If a serial data signal is being actively received from four data lanes 112 (as illustrated in FIG. 2), the alignment and deskew state machine 130 may select an aligned byte from each of the four data lanes to form the 32-bit word. If a serial data signal is being actively received from exactly two data lanes 112 (as illustrated in FIG. 3), the alignment and deskew state machine 130 may select two aligned bytes received from each of the data lanes 112 to form the 32-bit word. If a serial data signal is being actively received from exactly one data lane 112 (as illustrated in FIG. 4), the alignment and deskew state machine 130 may combine four consecutive received bytes to form the 32-bit word.

According to an embodiment, a "local link fault" received on an inbound or receive path may be detected at a location between the device 102 and a remote device (not shown) coupled to the device 102 by one or more data lanes 112. Also, a "remote link fault" provided on an out-bound or transmit path upon detection of a local link fault may be detected at a location a beyond the remote device. The receive state machine 128 may receive link fault signals indicating such a local or remote link fault from the remote device. Similarly, the transmit state machine 126 may transmit a link fault signal to the remote device indicating a local link fault or a remote link fault (e.g., a link fault detected at a location beyond the MAC 104).

According to an embodiment, if four pairs of data lanes (lanes 0 through 3) are actively transmitting data (i.e., each of four DLIs 114 are transmitting a serial data signal in a data lane 112 and each of four DLIs 115 are receiving a serial data signal from a data lane 112), link fault signals may be received by the receive state machine 128 or transmitted by the transmit state machine 126 as provided in IEEE Std. 802.3ae-2002, Clause 46.3.4. Here, four aligned bytes, one byte transmitted/received on each of four data lanes, may provide a link fault signal (e.g., a sequence control character in lane 0, data characters 0x00 in lanes 1 and 2, and data character 0x01 in lane 3 to indicate a local link fault or a data character 0x02 to indicate a remote link fault). If a single pair of data lanes is actively transmitting data (i.e., a single DLI 114 is transmitting a serial data signal in a data lane 112 and a single DLI 115 is receiving a serial data signal from a data lane 112), four bytes transmitted/received in series may provide the link fault signal (e.g., transmission of a sequence control character, two data characters 0x00, and data character 0x01 to indicate a local link fault or a data character 0x02 to indicate a remote link fault). Alternatively, the link fault signal may be transmitted/received in two serial bytes (e.g., a sequence control character followed by a data character 0x01 to indicate a local link fault or a data character 0x02 to indicate a remote link fault).

If exactly two pars of data lanes 112 are actively transmitting data (i.e., each of two DLIs 114 are transmitting a serial data signal in a data lane 112 and each of two DLIs 115 are receiving a serial data signal from a data lane 112), link fault signals may be transmitted/received as four bytes, two aligned bytes transmitted in a first byte interval followed by two aligned bytes transmitted in a second byte interval. For example, the first two aligned bytes may comprise a sequence control character and a data character 0x00. The second two aligned bytes may comprise a data character 0x00 and a data character 0x01 to indicate a local link fault or a data character 0x02 to indicate a remote link fault. In an alternative to transmitting two aligned bytes in a first byte interval followed by transmitting two aligned bytes in a second byte interval, two aligned bytes may be transmitted in a single byte interval where a first aligned byte provides a sequence control character and the second byte provides a data character 0x01 to indicate a local link fault or a data character 0x02 to indicate a remote link fault.

Upon receipt of the 32-bit word from the alignment and deskew state machine 128, the receive state machine 128 may format the 32-bit word for transmission as a 32-bit signal data signal in the MII 124. For example, where the MII 124 comprises a signal format as provided by an XGMII as described in IEEE Std. 802.3ae-2002, Clause 46, the 32-bit word may be formatted for transmission as the signal RXD<31:0> along with a control word RXC<3:0>. Accordingly, the receive state machine 128 may transmit a 32-bit word formatted as RXD<31:0> to the MII 124 on intervals of a clock signal RX_CLK such as, for example, on rising and falling edges of the clock signal RX_CLK. Similarly, a transmit state machine 126 may receive a formatted 32-bit word from the MII 124 as, for example, the XGMII signal TXD<31:0> along with a control word TXC<3:0> on intervals of a clock signal TX_CLK such as, for example, rising and falling edges of the clock signal TX_CLK. Such a clock signal TX_CLK may be generated and controlled by the MAC 104.

For each 32-bit word received from the MII 124, the transmit state machine 126 may partition the 32-bit word among data lanes 112 that are actively transmitting data (e.g., one byte per data lane 112 if four data lanes are actively transmitting, two bytes per data lane 112 if two data lanes are actively transmitting and four bytes on a single data lane 112 if one data lane is actively transmitting). The associated 8B10B codec 120 for each actively transmitting data lane 112 may then encode each byte into a corresponding ten bit code group for transmission to the data lane 112 through the PMA section 108 and PMD section 110.

According to an embodiment, the device 102 may maintain two clock domains, a first clock domain to control a data rate at of the transmit state machine 126 and receive state machine 128 (also, for example, at the MII 124) and a second clock domain to control the transmission and reception of the data at the individual data lanes 112. The clock signals TX_CLK or RX_CLK may be referenced to a first common clock signal controlling the first clock domain. The first common clock signal may also control the execution of the transmit state machine 126 and the receive state machine 128. By increasing or decreasing a frequency of the first common clock signal, the data rate at which the transmit state machine 126 transmits data to the data lanes 112 and the data rate at which the receive state machine 128 provides data to the MAC 104 may be increased or decreased. For example, by varying the frequency of the first common clock signal, the clock signals TX_CLK or RX_CLK (referenced to the first common clock signal) may have a frequency of about 156.25 MHz to maintain a data rate at the MII 124 of about ten gigabits per second (e.g., if four data lanes 112 are actively transmitting data and four data lanes 112 are actively receiving data), a frequency of about 78.12 MHz to maintain a data rate at the MII 124 of about five gigabits per second (e.g., if two data lanes 112 are actively transmitting data and two data lanes 112 are actively receiving data), and a frequency of about 39.06 MHz to maintain a data rate at the MII 124 of about 2.5 gigabits per second (e.g., if one data lane 112 is actively transmitting data and one data lane 112 is actively receiving data).

According to an embodiment, a second common clock signal may control the CDR and deserializer circuit 116, synchronization circuit 122 and 8B10B decoder 120 that is actively receiving a serial data signal from an associated data lane 112. Similarly, the second common clock signal may control the serializer circuit 118 and 8B10B decoder 123 that is actively transmitting a serial data signal in a corresponding data lane 112. the Independently of variations in the common clock signal controlling the first clock domain, according to an embodiment, the second common clock signal may control the transmission of serial data to or the reception or serial data from a data lane 112 at a fixed data rate (e.g., about 3.215 gigabits per second).

According to an embodiment, the slower of the first and second common clock signals may be generated from the faster of the first and second common clock signals using clock dividing circuitry known to those of ordinary skill in the art. According to an embodiment, the first common clock signal of the first clock domain may be controlled based upon an indication of a number of DLIs 115 that are actively transmitting a serial data signal to a data lane 112 or number of DLIs 114 that are actively receiving a serial data signal from a data lane 112. In one embodiment, the PMD section 110 may provide a four-bit signal signal_detect <3:0> to the PCS section 106 indicating which of the DLIs 114 are receiving a signal from an associated data lane 112 (e.g., as provided in IEEE P802.3ak—Clause 54.6.5 where PMD_signal_detect_n indicates whether a data lane n is receiving data). Alternatively, the PCS section 106 may receive data in a register of a Management Data Input/Output ("MDIO") Interface as provided in IEEE Std. 802.3ae-2002, Clause 45. However, these are merely examples of how a PCS section may detect a number of DLIs that may be transmitting data to or receiving data from a data lane, and embodiments of the present invention are not limited in these respects. Based upon a number of DLIs that are receiving a serial data signal from, or transmitting a serial data signal to a data lane 112 (e.g., four, two or one data lane 112) the frequency of the first common clock signal may be set to control the data rate of the MII 124 accordingly.

While the embodiment shown in FIG. 5 includes an MII 124, it should be understood that in other embodiments a transmit state machine (e.g., the transmit state machine 126) and a receive state machine (e.g., the receive state machine 128) may be integrated in a single device with a MAC or physical layer communication device independently of an MII. Accordingly, the transmit state machine may transmit data from the integrated device to a DDI at a data rate based, at least in part, on a number of data lanes actively transmitting a serial data signal. Similarly, the receive state machine may transmit data to the integrated device at a data rate based, at least in part on a number of data lanes actively transmitting a serial data signal.

While there has been illustrated and described what are presently considered to be example embodiments of the present invention, it will be understood by those skilled in the art that various other modifications may be made, and equivalents may be substituted, without departing from the true scope of the invention. Additionally, many modifications may be made to adapt a particular situation to the teachings of the present invention without departing from the central inventive concept described herein. Therefore, it is intended that the present invention not be limited to the particular embodiments disclosed, but that the invention include all embodiments falling within the scope of the appended claims.

What is claimed is:

1. A system comprising:
   a media access controller (MAC); and
   a communication device comprising:
      a media independent interface (MII) coupled to the MAC to at least one of transmit and receive data at a data rate;
      a plurality of data lane interfaces, each data lane interface being capable of at least one of transmitting a serial data signal to and receiving a serial data signal from a data lane in a device-to-device interconnection; and
      a transmitter coupled to the MII to receive data from the MII and coupled to selectively transmit the data to one or more of the data lane interfaces at a variable rate dependent upon a number of the data lane interfaces to which the transmitter is transmitting the data, wherein the transmitter is coupled to receive a transmit clock signal having a variable frequency dependent upon the number of the data lane interfaces actively transmitting a serial data signal.

2. The system of claim 1, wherein the system further comprises a switch fabric coupled to the MAC.

3. The system of claim 1, wherein the system further comprises a packet classification device coupled to the MAC.

4. A device comprising:
   a media independent interface (MII) to at least one of transmit and receive data at a data rate;
   a plurality of data lane interfaces, each data lane interface being capable of at least one of transmitting a serial data signal to and receiving a serial data signal from a data lane in a device-to-device interconnection; and
   a receiver coupled to receive one or more of the serial data signals from one or more corresponding data lane interfaces, the receiver further coupled to transmit the data to the MII at a variable rate dependent upon a number of the data lane interfaces from which the receiver is receiving the one or more serial data signals, wherein the receiver is coupled to receive a receive clock signal having a variable frequency dependent upon the number of the data lane interfaces actively receiving a serial data signal.

5. The device of claim 4, wherein each data lane interface is associated with a first differential pair to transmit a serial data signal and a second differential pair to receive a serial data signal.

6. The device of claim 5, wherein the plurality of data lane interfaces are capable of transmitting data to and receiving data from a 10 gigabit attachment unit interface.

7. The device of claim 4, wherein the device further comprises:
- a plurality of 8B10B decoders, each 8B10B decoder being associated with one of the data lane interfaces, each 8B10B decoder being capable of decoding one eight bit byte from a differential pair on first intervals of a first clock signal;
- a receive state machine to provide a fixed length data signal to the MII on second intervals of a second clock signal; and
- logic to vary the second intervals based upon a number of the data lane interfaces actively receiving serial data from the device-to-device interconnection.

8. The device of claim 4, wherein the device further comprises:
- a transmit state machine to receive a fixed length data signal from the MII on first intervals of a first clock signal;
- a plurality of 8B10B encoders, each 8B10B encoder being associated with one of the data lane interfaces, each 8B10B encoder being capable of encoding one eight bit byte of the fixed length data signal for transmission to a differential pair on first intervals of a first clock signal; and
- logic to vary the second intervals based upon a number of the data lane interfaces actively transmitting serial data from to the device-to-device interconnection.

9. The device of claim 4, wherein the device-to-device interconnection comprises printed circuit board traces.

10. The device of claim 4, wherein the device-to-device interconnection comprises a cable.

11. A method comprising:
- at least one of transmitting data to and receiving data from a media independent interface (MII) at a data rate;
- at least one transmitting a serial data signal to and receiving a serial data signal from one or more data lanes in a device-to-device interconnection, each data lane being coupled to the MII by an associated data lane interface;
- varying the data rate based, at least in part, upon a number of the data lane interfaces actively transmitting a serial data signal to or actively receiving a serial data signal from the device-to-device interconnection; and
- generating a variable clock signal for timing the transmitting having a frequency based upon the number of data lane interfaces actively transmitting a serial data signal.

12. The method of claim 11, the method further comprising:
- transmitting one or more serial data signals to the device-to-device interconnection in a first differential pair signal; and
- receiving one more serial data signals from the device-to-device interconnection in a second differential pair signal.

13. The method of claim 12, the method further comprising transmitting data to and receiving data from a 10 gigabit attachment unit interface.

14. The method of claim 11, wherein the method further comprises:
- at one or more data lane interfaces, receiving a serial data signal from the device to device interconnection;
- decoding the serial data signal according to an 8B 10B decoding scheme to provide an eight-bit byte on byte intervals;
- providing a fixed length data signal to the MII on intervals of a clock signal having a frequency; and
- varying the frequency of the clock signal based upon a number of the data lane interfaces actively receiving a serial data signal from the device-to-device interconnection.

15. The method of claim 11, wherein the method further comprises:
- receiving a fixed length data signal from the MII on intervals of a clock signal having a frequency, the fixed length data signal having a plurality of eight-bit bytes;
- encoding each eight-bit byte into a ten bit code group according to an 8B10B encoding scheme;
- transmitting the code groups to the device-to-device interconnection through one or more data lane interfaces; and
- varying the frequency of the clock signal based, at least in part, upon a number of data lane interfaces actively transmitting serial data to the device-to-device interconnection.

16. The method of claim 11, wherein the device-to-device interconnection comprises printed circuit board traces.

17. The method of claim 11, wherein the device-to-device interconnection comprises a cable.

18. A system comprising:
- a physical layer communication device to transmit data between a transmission medium and a media independent interface (MII) at a data rate; and
- a communication device comprising:
  - a plurality of data lane interfaces, each data lane interface being capable of at least one of transmitting a serial data signal to and receiving a serial data signal from a data lane in a device-to-device interconnection; and
  - a transmitter coupled to the MII to receive data from the MII and coupled to selectively transmit the data to one or more of the data lane interfaces at a variable rate dependent upon a number of the data lane interfaces to which the transmitter is transmitting the data, wherein the transmitter is coupled to receive a transmit clock signal having a variable frequency dependent upon the number of the data lane interfaces actively transmitting a serial data signal.

19. The system of claim 18, wherein the physical layer communication device is adapted to transmit data between the MII and a fiber optic cable.

20. The system of claim 18, wherein the physical layer communication device is adapted to transmit data between the MII and a twisted wire pair cable.

21. A device comprising:
- a physical coding sublayer (PCS) including a state machine to at least one of transmit and receive data at a data rate;
- a physical media dependent (PMD) section including a plurality of data lane interfaces, each data lane interface being capable of at least one of transmitting a serial data signal to and receiving a serial data signal from a data lane in a device-to-device interconnection, wherein the PMD section is coupled to the PCS section to signal to the PCS section a number of the data lane interfaces actively transmitting a serial data signal; and
- logic to vary the data rate based, at least in part, upon the number of the data lane interfaces actively transmitting a serial data signal to or actively receiving a serial data signal from the device-to-device interconnection, wherein the state machine is coupled to receive a clock signal to time transmitting or receiving the data having a variable frequency dependent upon a number of the plurality of data lane interfaces that are actively transmitting or receiving a serial data signal.

22. The device of claim 21, wherein each data lane interface is associated with a first differential pair to transmit a serial data signal and a second differential pair to receive a serial data signal.

23. The device of claim 22, wherein the plurality of data lane interface are capable of transmitting data to and receiving data from a 10 gigabit attachment unit interface.

24. The device of claim 21, wherein the device further comprises a MAC to at least one of transmit data to and receive data from the state machine at the data rate.

25. The device of claim 21, wherein the device further comprises a physical layer communication device to at least one of transmit data to and receive data from the state machine at the data rate.

26. The device of claim 21, wherein the device-to-device interconnection comprises printed circuit board traces.

27. The device of claim 21, wherein the device-to-device interconnection comprises a cable.

28. A method comprising:
   at least one of transmitting data to and receiving data from a state machine at a data rate;
   at least one transmitting a serial data signal to and receiving a serial data signal from one or more data lanes in a device-to-device interconnection, each data lane being coupled to the state machine by an associated data lane interface;
   varying the data rate based, at least in part, upon a number of the data lane interfaces actively transmitting a serial data signal to or receiving a serial data signal from the device-to-device interconnection; and
   generating a variable clock signal for timing the receiving having a frequency based upon the number of data lane interfaces actively receiving a serial data signal.

29. The method of claim 28, the method further comprising:
   transmitting one or more serial data signals to the device-to-device interconnection in a first differential pair signal; and
   receiving one more serial data signals from the device-to-device interconnection in a second differential pair signal.

30. The method of claim 29, the method further comprising transmitting data to and receiving data from a 10 gigabit attachment unit interface.

31. The method of claim 28, wherein the device further comprises:
   controlling the data rate according to a frequency of the variable clock signal;
   at one or more data lane interfaces, receiving a serial data signal from the device to device interconnection;
   decoding the serial data signal according to an 8B 10B decoding scheme to provide an eight-bit byte on byte intervals; and
   varying the frequency of the variable clock signal based upon a number of the data lane interfaces actively receiving a serial data signal from the device-to-device interconnection.

32. The method of claim 28, wherein the method further comprises:
   receiving a fixed length data signal at the state machine at a rate controlled by a transmit clock signal having a frequency, the fixed length data signal having a plurality of eight-bit bytes;
   encoding each eight-bit byte into a ten bit code group according to an 8B10B encoding scheme;
   transmitting the code groups to the device-to-device interconnection through one or more data lane interfaces; and
   varying the frequency of the transmit clock signal based, at least in part, upon a number of data lane interface actively transmitting serial data to the device-to-device interconnection.

33. The system of claim 1, wherein the communication device further comprises:
   a physical coding sublayer ("PCS") including the transmitter; and
   a physical media dependent ("PMD") section including the plurality of data lane interfaces, the PMD section coupled to the PCS section to signal to the PCS section the number of the data lane interfaces actively transmitting a serial data signal.

34. The system of claim 33, wherein the transmitter comprises a state machine.

* * * * *